US010902210B2

(12) United States Patent
Arvela et al.

(10) Patent No.: US 10,902,210 B2
(45) Date of Patent: Jan. 26, 2021

(54) SYSTEM AND METHOD FOR GENERATING BLOCKS OF NATURAL LANGUAGE

(71) Applicant: IPRally Technologies Oy, Helsinki (FI)

(72) Inventors: Sakari Arvela, Vantaa (FI); Juho Kallio, Helsinki (FI)

( * ) Notice: Subject to any disclaimer, the term of this patent is extended or adjusted under 35 U.S.C. 154(b) by 158 days.

(21) Appl. No.: 16/234,637

(22) Filed: Dec. 28, 2018

(65) Prior Publication Data

US 2019/0205392 A1 Jul. 4, 2019

(30) Foreign Application Priority Data

Dec. 30, 2017 (EP) ..................................... 17211256

(51) Int. Cl.
*G06F 40/30* (2020.01)
*G06F 40/56* (2020.01)

(52) U.S. Cl.
CPC .............. *G06F 40/30* (2020.01); *G06F 40/56* (2020.01)

(58) Field of Classification Search
CPC .......... G06F 40/30; G06F 40/00; G06F 40/10; G06F 40/14; G06F 40/174; G06F 40/20; G06F 40/205; G06F 40/211; G06F 40/247; G06F 40/35; G06F 40/40; G06F 40/55; G06F 40/56
USPC .................................. 704/2, 4, 7, 10, 257, 9
See application file for complete search history.

(56) References Cited

U.S. PATENT DOCUMENTS

| 9,582,501 | B1 | 2/2017 | Salmon et al. |
| 2015/0066477 | A1* | 3/2015 | Hu ........................ G06F 40/211 |
| | | | 704/9 |
| 2015/0324347 | A1 | 11/2015 | Bradshaw et al. |
| 2017/0075877 | A1* | 3/2017 | Lepeltier ............... G06F 40/205 |
| 2017/0337191 | A1* | 11/2017 | Narayanan .............. G06F 40/56 |

OTHER PUBLICATIONS

Reiter: "An architecture for data-to-text systems", Natural Language Generation, Association for Computational Linguistics, Jun. 17, 2007 pp. 97-104.

\* cited by examiner

*Primary Examiner* — Qi Han
(74) *Attorney, Agent, or Firm* — Laine IP Oy

(57) ABSTRACT

The invention relates to a system and method for generating a block of natural language, the system comprising a digital data store capable of storing a data graph according to a data schema, input sub-system for entering natural language data units to the data graph, and a data processor for generating a block of natural language based on the data graph. Further, the data schema allows storage of recursively nested natural language data units and relation data units associated with the natural language data units into the data graph, the relation data units being configured to define relations between natural language data units in the data graph. The data processor is adapted to generate said block of natural language utilizing a plurality of natural language data units and relations between the natural language data units as defined by the relation data units associated therewith.

19 Claims, 9 Drawing Sheets

*Root feature*
vehicle

*Vehicle comprises...*
　　wheels

*Vehicle comprises...*
　　electric motor

*Electric motor is provided for...*
　　　　rotating [wheels] for moving [vehicle]

*Electric motor is for example...*
　　　　brushless motor

*Electric motor comprises...*
　　　　rotor

*Electric motor is proveded for...*
　　　　stator

*Vehicle comprises...*
　　engine space

*Engine space relates to other features such that...*
　　　　[engine space] fully encloses [electric motor]

Fig. 7A

1. A vehicle comprising
   - engine space
   - electric motor wherein engine space fully encloses electric motor 2. The vehicle according to claim 1 wherein electric motor comprises rotor 3. The vehicle according to claim 1 or 2 wherein electric motor is brushless motor 4. The vehicle according to any of claims 1-3 comprising wheels wherein electric motor is provided for rotating wheels for moving vehicle

Fig. 7B

SYSTEM AND METHOD FOR GENERATING BLOCKS OF NATURAL LANGUAGE

FIELD OF THE INVENTION

The invention relates to natural language processing. In particular, the invention relates to a system and method for generating blocks of natural language. The invention can be used, in particular, for generating expository and argumentative writings, such as technical and/or legal writings.

BACKGROUND OF THE INVENTION

Technical and legal writings are typically generated manually using computerized text editing tools, so-called word processors, from the scratch or using text templates. This is time-consuming, does not guarantee the consistency of the writing and the resulting writing and parts thereof are difficult to analyze and re-use by computers. There are automated tools to alleviate some of these drawbacks, for example proofreaders, spell-checkers and find-and-replace tools, but their abilities are very limited for editorial purposes. In addition, there are purpose-specific tools that may be used to ensure e.g. that all required parts of the writing are present, its contents obey certain rules and are formatted as intended. These tools operate either after of simultaneously to manual text editing. The fundamental problems still remain at least to some extent.

SUMMARY OF THE INVENTION

It is an aim of the invention to solve at least some of the abovementioned problems and to provide a novel system and method for defining various concepts and producing natural language describing the concepts. In particular, it is an aim to provide a solution, which can be used to produce structured blocks of natural language and allow for easily changing the content of the block of natural language without manual editorial work.

One aim is also to provide a solution, which facilitates computerized analysis of natural language.

According to one aspect, the invention provides a system for generating a block of natural language, the system comprising a digital data store capable of storing a data graph according to a data schema, input means (i.e. input sub-system) for entering natural language data units to the data graph, and a data processor for generating a block of natural language based on the data graph. Further, the data schema allows storage of recursively nested natural language data units and relation data units associated with the natural language data units into the data graph, the relation data units being configured to define relations between natural language data units in the data graph. The input means can be in particular user interface means, in particular graphical user interface means. The relations can comprise particular semantic relations. The relations can also comprise thematic relations. The relations can also comprise quantity relations. The relations can also comprise logic relations.

According to one aspect, the data processor is further adapted to generate the block of natural language utilizing a plurality of natural language data units selected from the data graph according to predefined selection criteria, such as user input or automatic selection algorithm, and relations between the natural language data units as defined by the relation data units associated therewith. For example, the data processor may be adapted to utilizing a first natural language data unit, one or more second natural language data units nested under the first natural language data unit, and relation data units associated with the first and/or one or more second natural language data units.

According to one aspect, the data processor is further adapted to select a first set of natural language data units according to the predefined selection criteria and to form a second set of natural language data units based on the first set and relation data units associated with the data units in the first set, the second set being a superset of the first set, and using the second set for generating the block of natural language.

According to an alternative or supplementary aspect, the input means comprises user interface means is configured to illustrate the natural language data units as human-readable and editable natural language data elements on a display, the nesting level of the natural language data unit in the data graph being reflected as vertical or horizontal position of the data natural language element on the display. Further, the user interface means may allow for creating new data elements corresponding to new natural language data units in the data graph and changing the nesting level of the data units in the data graph by moving the data elements on the display using a user input device functionally connected to the system.

According to one aspect, the invention provides a system and method of producing a block of natural language comprising storing natural language data units in a digital data store, and processing contents of the data store as to generate the block of natural language using the natural language data units. The data units are stored at least partially in a recursive data graph, whose structure is defined by a data schema, and at least some of the natural language data units are associated with relation data unit values that describe semantic, thematic, logic and/or quantitative relations between two natural language data units.

In one aspect, the processing of the data graph by the data processor comprises selecting a first and one or more second natural language data units from the recursive data graph, using the first data unit and the second data unit and predefined selection rules, selecting from the recursive data graph a data unit set which is a subset of all natural language data units of the data graph, and using the data unit set and the relation data values for generating the block of natural language.

In particular, the invention is characterized by what is stated in the independent claims.

The invention offers significant benefits. First, the invention provides a formalized and structured way in which concrete and abstract concepts can be defined using natural language but without actually producing the natural language in full. Recursive nested storage of natural language data units in connection with relations defined therewith has been found to be an efficient tool for this purpose. The user of the system can be efficiently and intuitively guided to define concepts for different purposes. Guidance can be given by customization of the user interface for the particular purpose. The well-defined data structure underlying the user interface ensures that the data entered stays organized and re-usable for text generation and automated analysis.

The invention allows for entering complex concepts into the data graph and only later, by selection of the first and one or more second data units that form the basis of the text generation, choose what sub-concept of the complex concept is to be written as a block of natural language. Natural language output of the sub-concept is typically longer than individual natural language data units of the graph but shorter than natural language output of the full concept would be.

The data graph according to the invention can be used for computerized analysis of natural language, but is still human-readable and, in particular, visually human-perceivable, if presented in visual form on a display using user interface means. The concept defined in the graph is also easily modifiable with user interface elements and actions, as will be exemplified later in more detail. Editorial work can be minimized. Computerized analysis is facilitated, because essential natural language relations and technical relations can be defined in a very exact way using the relation data units, as will be described later in more detail.

The dependent claims are directed to selected embodiments of the invention.

In some embodiments, the data schema allows for storage of natural language data units that contain one or more non-natural language references (e.g. integer references) to one or more other natural language data units of the data graph. This allows for implementing for example a system, in which the text content of each natural language data unit, or at least most of them, need to be stored only once, and a system in which the changing of the content of natural language data unit is instantly reflected in natural language data units referring thereto. This saves time when entering concepts to the data graph and allows for defining complexly networked concepts in a tree-format data graph, for example.

In some embodiments, the data processor is adapted to select a first and one or more second natural language data units according to predefined selection criteria from the recursively nested data, and to travel the recursively nested data graph according to predefined rules starting from the one or more second natural language data units to the first natural language data unit, or vice versa, for creating a data unit set, which is used in the natural language generation. In particular, the data unit set and the relation data units associated with natural language data units therein can be used to generate the block of natural language. This model is efficient for generating semantically and technically coherent and exact natural language for technical and/or legal documents, such as patent applications.

In some embodiments, the predefined rules are adapted to utilize at least one, two or all of the following for creating the data unit set and/or generating the block of natural language: the relative nesting position of the natural language data units in the data graph, the contents of the natural language data units, the contents of relation data units associated with the natural language data units.

In some embodiments, travelling of the data graph comprises selecting into the data unit set one or more additional natural language data units based on content of the first and/or one or more second data units, and optionally recursively further additional data units based on the content of the additional data units. Thus, additional data units different from the first and second data units can be included to the set and used to generate into the block of natural language.

In some embodiments, each of the relation data units selectively link the natural language data unit is associated with to one of at least two relation classes defining different relations between the natural language data unit and its parent unit such that linking to different relation classes is reflected as generation of different block of natural language by the data processor.

In some embodiments, the data schema is configured to store the nested natural language data units and relation data units as data items each containing a natural language data unit and a relation data unit associated therewith. In another example, the nested natural language data units and relation data units are stored as data items containing the natural language data unit and edge items connecting two or more data items, the relation data units being contained in the edge items. A combination of these approaches is possible, too.

In some embodiments, the data schema allows for storage of two types of relation data units, the first type at least partly or entirely pre-defining a semantic, thematic, logic or quantity relation, the pre-defined relation being selectable via the input means being user interface means, and the second type allowing the user to define the semantic, thematic, logic or quantity relation via the user interface means. In some cases, the first type is enough, but the option for the second type further increases the flexibility of the system.

In some embodiments, the relation data units comprise at least a first class of relation data units defining relations between successively nested natural language data units, the relations being selectable from a predefined set of subclasses of relations, such as a set comprising a meronym subclass and hyponym subclass within the semantic relation class.

In some embodiments, the input means is user interface means configured to allow user-selection of the content of a relation data unit associated between two successively nested natural language data units.

Alternatively or in addition, the data processor can be configured to choose the content of a relation data unit, in particular a semantic relation data unit, associated between two successively nested natural language data units based on the contents of the natural language data units. For example, a linguistic database can be used to determine that a finger is a meronym (part of) a hand.

In some embodiments, the input means is user interface means and the first natural language data unit and the one or more second natural language data units are selected by the data processor by the user interface means comprising a user-selectable marking elements associated with the natural language data units and the data processor selecting the first natural language data unit and the one or more second natural language data units based on state of the marking element.

Alternatively or in addition, the first natural language data unit and the one or more second natural language data units can be selected automatically by the data processor, for example based on the position of the data units in the data graph and/or the user interface means. This allows for quick generation of different texts based on the same data graph.

Next, selected embodiments of the invention and advantages thereof are discussed in more details with reference to the attached drawings.

BRIEF DESCRIPTION OF THE DRAWINGS

FIG. 7A shows a screenshot of an exemplary user interface for inputting a data graph.

FIG. 7B shows a screenshot of an exemplary claim set generated using the data graph example of FIG. 7A.

DETAILED DESCRIPTION OF EMBODIMENTS

Definitions

Figure 1:
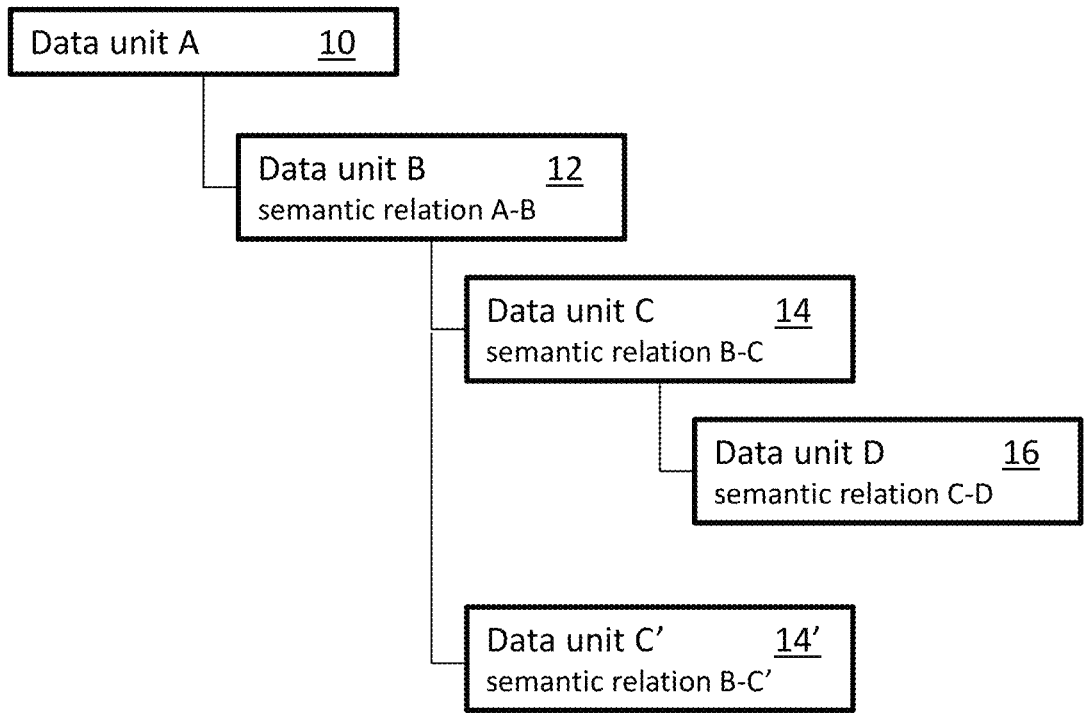
FIG. 1 shows a block diagram of an exemplary nested data graph with semantic relations.

"Natural language data unit" herein means a unit of natural language, in particular a word or a multi-word concept, stored in computer-readable form. A natural language data unit may be presented as a set of character values (known usually as "strings" in computer science) or combination of strings and non-natural language references to other data units (e.g. as integers (such as data unit ID's) or memory addresses). In this document, the term "data unit" alone, unless not otherwise indicated, refers to "natural language data unit", in contrast to "relation data units" that are configured to store semantic, thematic, logic or quantity relation data between two or more natural language data units. Relation data units need not (but can) contain natural language.

"Block of natural language" refers to a linguistically meaningful combination of natural language data units, for example one or more complete or incomplete sentences, such as a paragraph of a technical or legal writing, a claim or part of description of a patent application, part of a technical manual or other expository writing. The block of natural language can be expressed, for example as a single string and stored to a file in a file system and/or displayed to the user via the user interface, usually together with other blocks of natural language. "Block of natural language" is herein sometimes referred to as "text".

"Claim (of a patent application)" is herein defined as a block of natural language which would be considered as a claim by the European Patent Office at the effective date of this patent application.

Next, four exemplary main relation classes and subclasses therein are introduced.

"Semantic relation" herein means any relationship between two or more data units based on the meaning of the data units. In particular, a semantic relation may be a meronymy relation (X is part of Y), a holonymy relation (Y has X as part of itself), a hyponymy (troponymy) relation (X is a subordinate of Y), a hypernymy relation (X is a superordinate of Y) or a synonymy relation (X is the same as Y). Semantic relations are typically defined between successively nested data units. In one example, the semantic relation of a child data unit to a parent data unit thereof is associated with the child data unit (typically either in a child item or an edge item between parent and child data items, as will be exemplified later in more detail). In this case, the semantic relation is typically either a meronymy relation or a hyponymy relation (or, as an optional third choice, a synonymy relation).

"Thematic relation" herein means the role that a data unit plays with respect to one or more other data units, other than semantic relations. At least some thematic relations can be defined between successively nested data units. In one example, the thematic relation of a parent data unit is defined in the child data unit. An example of thematic relations is the role class "function". For example, the function of "handle" can be "to allow manipulation of an object". Such thematic relation can be stored as a child data unit of the "handle" data unit, the "function" role being associated with the child data unit. A thematic relation may also be a general-purpose relation which has no predefined class (or has a general class such as "relation"), but the user may define the relation freely. For example, a general-purpose relation between a handle and a cup can be "[handle] is attached to [cup] with adhesive". Such thematic relation can be stored as a child unit of either the "handle" data unit or the "cup" data unit, or both, preferably with inter-reference to each other.

"Logic relation" herein refers to rules defining the co-existence of two or more data units in the concept the natural language block to be formed describes. Logic relations are conveniently expressed by means of boolean operators, such as "and", "or", "exclusive or". Logic relations can typically be defined at least between sibling data units, but may in general be defined also between non-siblings.

"Quantity relation" herein refers to rules defining the amount of one or more units in one or more other units. For example, a quantity relation may be equivalent to "exactly X", "at least X" or "X or more (less)", "more (less) than X", "from X to Y", etc. Quantity relations are typically defined between successively nested data units.

A relation data unit is considered to define a relation in a particular relation class or subclass, if it is linked to computer-executable code that produces a block of natural language including that a relation in that class or subclass when run by the data processor.

"Data schema" refers to the rules according to which data, in particular natural language data units and data associated therewith, are organized. Typically, the system comprises also checking rules that are run when data is added, removed and/or changed, the checking rules ensuring that the data schema is not violated.

"Data graph" refers to a data instance that follows the data schema, i.e. a data ordered according to the data schema. In typical embodiments, the present system is capable of simultaneously containing several different data graphs that follow the same data schema and whose data originates from and/or relates to different sources. The data graph can in practice stored in JSON-format or the like format, object format, and/or in a relational or non-relational database format, or any other format allowing for storage of recursive data items.

"Nesting" of data units refers to the ability of the data units to have one or more children and one or more parents, as determined by the data schema. In one example, the data units can have one or more children and only a single parent. A root unit does not have a parent and leaf units do not have children. Sibling units have the same parent. "Successive nesting" refers to nesting between a parent unit and direct child unit thereof.

"Data item" refers to a data container or object containing at least one data unit and, optionally, its associated data, such as additional information on the data unit used and/or its position in the data graph, as defined by the data schema.

"Recursive" nesting or data schema refers to nesting or data schema allowing for similar data items to be nested.

The terms "digital data store", "user interface means" and "data processor" refer primarily to software means, i.e. computer-executable code, that are adapted to carry out the specified functions, that is, storing of digital data, allowing user to interact with the data, and processing the data, respectively. All of these components of the system can be carried in a software run by either a local computer or a web server, through a locally installed web browser, for example, supported by suitable hardware for running the software components. For example, the user interface means may comprise computer-executable code which, when run on a web browser or other program connected to the system, can produce the user interface elements as required.

Description of Selected Embodiments

Although some embodiments of the invention are in the following elucidated by means of relatively simple graphs with some specific structure and/or data content, the principles are generally applicable to any data schemas allowing for storage of such graphs.

In some embodiments, the relation data units comprise at least semantic relation data units defining semantic relations between successively nested natural language data units, the semantic relations preferably being entirely or partly selectable from a predefined set of semantic relations through the input means. The predefined set may comprise or consist of a meronymy/holonymy relation and a hyponymy/hypernymy relation (depending on whether defined as seen from child unit to parent unit or vice versa). This allows for defining both concrete and abstract concepts efficiently and exactly using the data graph.

In some embodiments data processor is adapted to generate the block of natural language using a set of natural language data units semantically connecting the first and one or more second natural language data units using the semantic relation data units. This allows for generating clear and concise text. The set chosen may be a minimal set that is required to semantically connect two or more natural language data units to each other, as defined by the graph structure and the sematic relations defined. This is useful e.g. in generating claims of a patent application.

FIG. 1 shows an example of a data graph according to one embodiment. The graph comprises a root data item 10 and three nested children data items 12, 14, 16 in linear succession and a branch comprising a data item 14' nested under data item 12. Each data item comprises a natural language data unit A, B, C, D, C', respectively. Children data items 12, 14, 16, 14' comprise information on the semantic relation between a corresponding data unit and its parent, i.e. semantic relations A-B, B-C, C-D and B-C', respectively. In this example, only semantic relations between the data units are defined.

For example, to describe a certain type of a motor vehicle, the content of the graph of FIG. 1 could be: Data unit A="vehicle", Data unit B="engine space" (semantic relation A-B="meronym"), Data unit C="electric motor" (semantic relation B-C="meronym"), Data unit C'="fuel motor" (semantic relation B-C'="meronym"), Data unit D="brushless motor" (semantic relation C-D="hyponym").

In some embodiments, the relation data units comprise thematic relation data units defining thematic relations between successively nested natural language data units, and the data processor is adapted to generate the block of natural language using a set of natural language data units thematically connecting the first and one or more second natural language data units using the thematic relation data units. The thematic relations may be entirely or partly selectable from a predefined set of thematic relations through user interface means. The predefined set may comprise for example a "function" relation and a "definition" relation or equivalents thereof. This allows for defining complex technical concepts in an efficient and exact way and producing natural language therefor.

Figure 2:
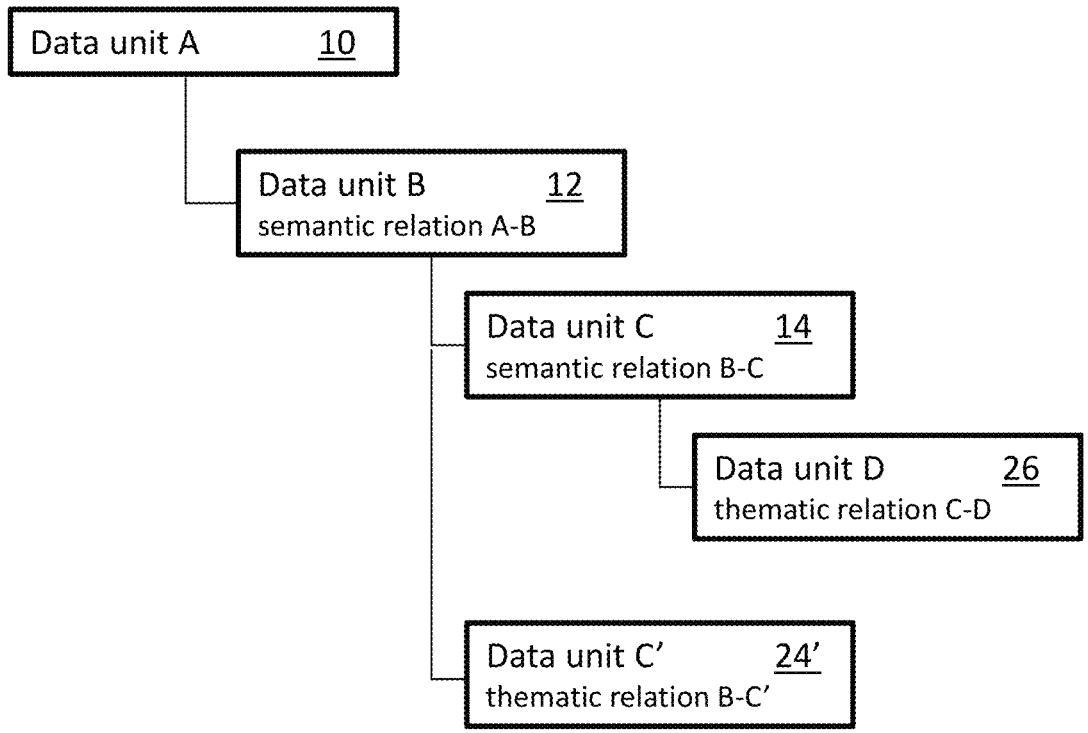
FIG. 2 shows a block diagram of an exemplary nested data graph with semantic relations and thematic relations.

FIG. 2 shows an example of a graph comprising both semantic and thematic relations. Otherwise, the exemplary graph is similar to that of FIG. 1, but the leaf data items 26, 24' are thematically related to their parent items 14, 12, respectively, through thematic relations D-B, B-C' associated with the data units D and C'.

Amending the abovementioned motor vehicle example the new data items 26, 24' could be for example: Data unit D="for moving the [vehicle]" (thematic relation C-D="function"), Data unit C'="fully encloses the [electric motor]" (thematic relation B-C'="relation").

It should be noted that the sematic and thematic relations in the abovementioned examples need not be defined not by any explicit names (descriptive string values), but can be defined using other appropriate data field values, such as boolean or integer constants or variables, that have the same meaning for natural language generation purposes. The data fields may be associated with constant natural language units or natural dynamic language generation functions.

In practice, association of the relations with the data units can be done in different ways. In FIGS. 1 and 2, the association is carried out by including the relation information as data fields in the data items, along with the data fields comprising the natural language data, i.e, into the nodes of the graph.

Figure 3:
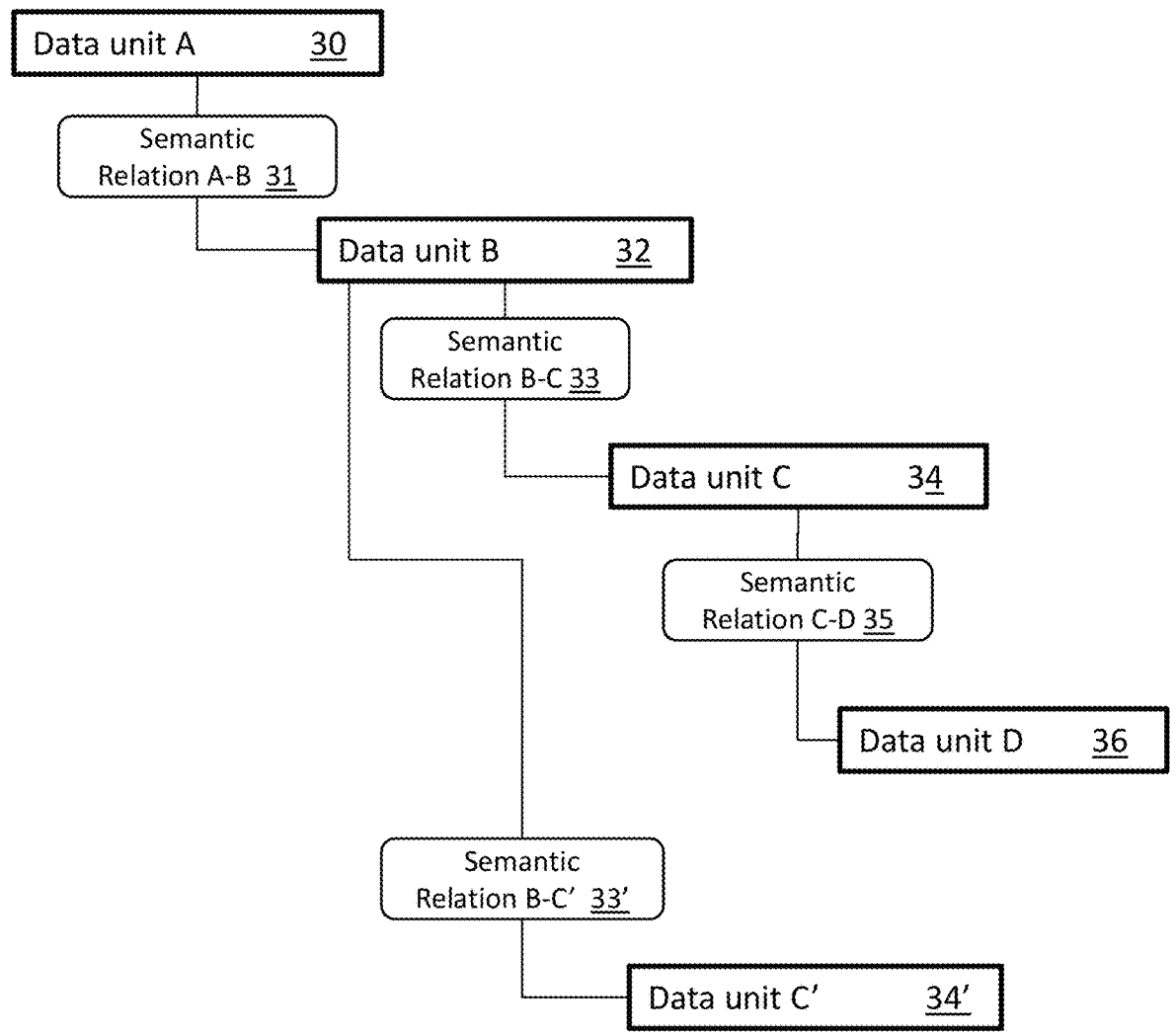
FIG. 3 shows a block diagram of an alternative exemplary nested data graph with semantic relations relations.

FIG. 3 shows a variation where the relations are associated with the edges of the graph, i.e., links between the data item nodes. That is, there is provided data items 30, 32, 34, 36, 34' arranged hierarchically in a similar fashion as in FIGS. 1 and 2 and contain the natural language data units A, B, C, D, C', respectively. Instead of including the relation information to the data items 30, 32, 34, 36, 34', there are additional edge items 31, 33, 35, 33', which contain the relation information. This offers freedoms of design of the graph and also makes possible to allow also more complex graph models than the tree model shown in the FIGS. 1-3.

The embodiments illustrated in FIGS. 1-3 can also be combined.

In some embodiments, the relation data units comprise logic relation data units, and/or quantity relation data units, allowing for storage of information on logic relation or quantity relation, between two or more natural language data units. The data processor is further adapted to generate the block of natural language using the logic relation data units and/or quantity relation data units. This allows for further increasing the level of complexity of concepts that can be defined in the data graph and further output in text form.

Figure 4A:
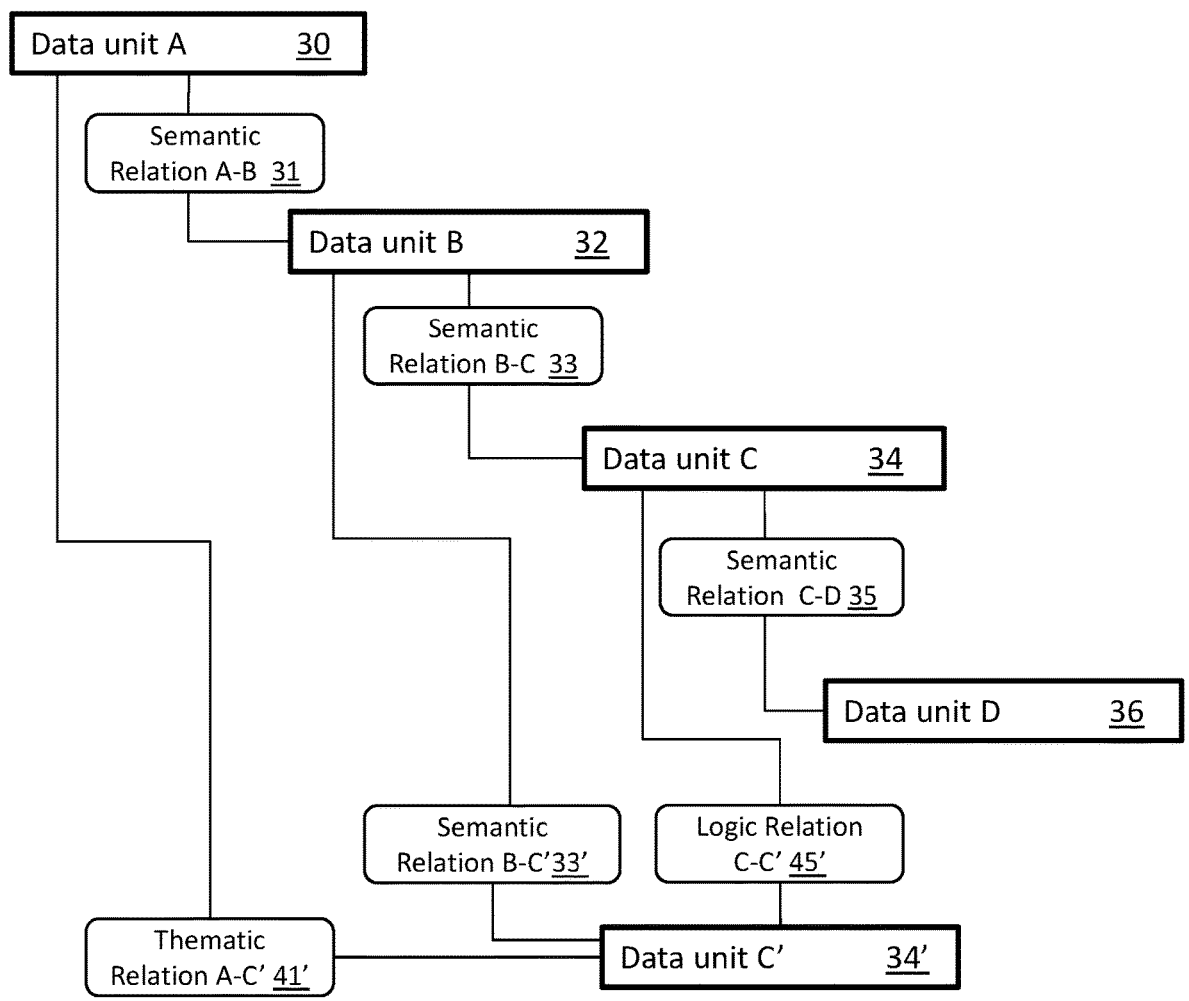
FIG. 4A shows a block diagram of an exemplary nested data graph with semantic relations, thematic relations and logic relations.

FIG. 4A shows a further embodiment, which has the same node structure as in FIG. 3, but additionally comprises a thematic relation A-C' defined in edge item 41' between data item 30 and data item 34' and a logic relation C-C' defined in edge item 45' between data item 34 and data item 34'.

Figure 4B:
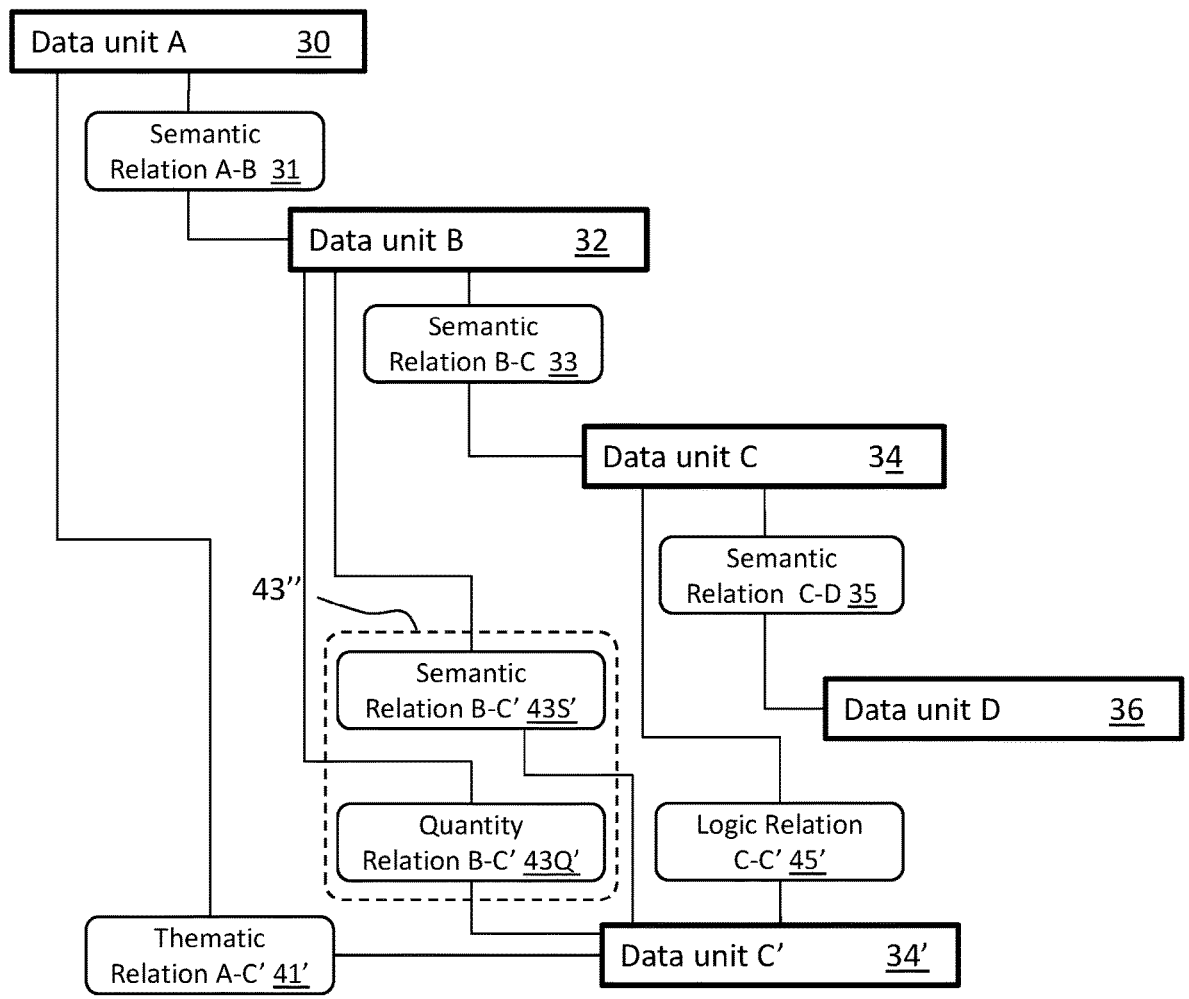
FIG. 4B shows a block diagram of an exemplary nested data graph with semantic relations, thematic relations, logic relations and quantity relations.

FIG. 4B shows a still further embodiment, additionally comprising a multi-relation edge item 43" between data item 32 and data item 34'. The multi-relation edge item 43" includes a semantic relation B-C' in edge sub-item 43S' and a quantity relation B-C' in edge sub-item 43Q'.

In some embodiments, the natural language data unit, associated with at least some or all types of relations, or data item enclosing the data unit, may comprise non-natural language references to one or more other natural language data units or data items of the data graph. This allows for creating internal links inside the data graph, other than the parent/child links inherent to the data schema for defining complex concepts. In particular, such references are beneficial for defining thematic relations. Each natural language data unit or data item enclosing the data unit, is preferably given an ID, which can be used as the reference using a suitable data structure capable of storing the reference. In one example, the natural language data units are ordered lists, or equivalent structures, in which each list item can be a string or a reference.

The system may comprise rules adapted to determine check the part of speech and or inflected form of at least some of the data units or parts thereof. In some embodiments, the part of speech is stored in an associated part-of-speech data field. In some embodiments, the inflected form is automatically corrected according to predefined inflection rules associated with the type of relation associated with the data unit, if necessary.

In some embodiments, the system comprises rules for checking that the part of speech of at least some data units is noun, or that the data unit is a compound comprising a noun, in particular one ending with a noun. In some embodiments, the system comprises rules for checking that the part of speech of at least some data units is verb. In some embodiments, the system comprises rules for checking that the inflection form of at least some verb data units is an "-ing"-form (in particular a gerund form). If necessary, an automatic correction or user alert can be made.

Figure 5:
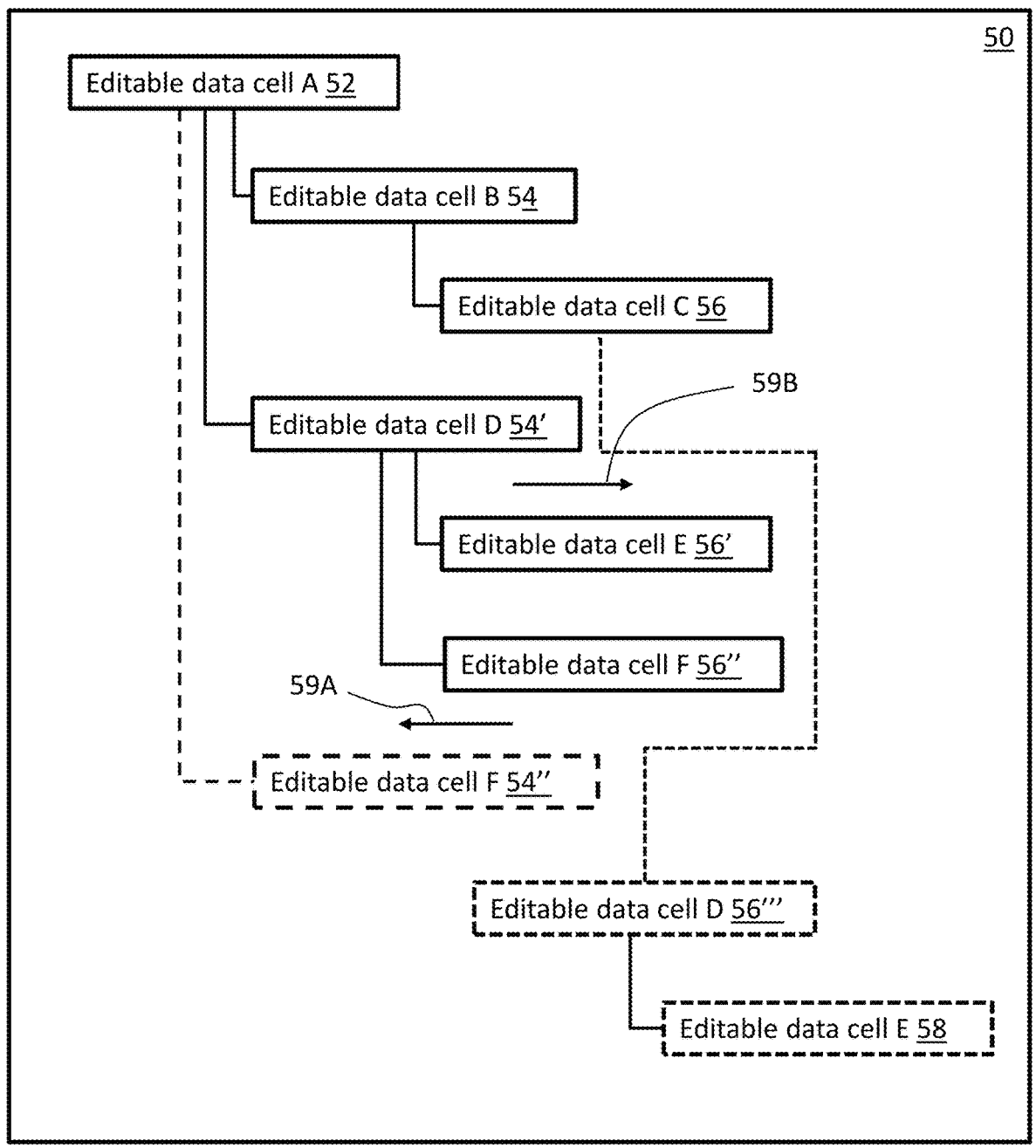
FIG. 5 illustrates contents of an exemplary display element of the user interface for the modifying a data graph.

FIG. 5 illustrates the representation and modification of an exemplary data graph on a display element 50 of a user interface. The display element 50 comprises a plurality of editable data cells A-F (non-apostrophed), whose values are functionally connected to corresponding data units (say, data units A-F, correspondingly) of an underlying data graph and are shown in respective user interface (UI) data elements 52, 54, 56, 54', 56', 56". The UI data elements may be e.g. text fields whose value is editable by keyboard after activating the element. The UI data elements 52, 54, 65, 54' 56' 56" are positioned on the display element 50 horizontally and vertically according to their position in the data graph. Herein, horizontal position corresponds to the depth of the data unit in the graph.

The display element 50 can be e.g. a window, frame or panel of a web browser running a web application, or a graphical user interface window of a standalone program executable in a computer.

The user interface comprises also a shifting engine which allows for moving the data units horizontally (vertically) on the display element in response to user input, and to modify the data graph accordingly. To illustrate this, FIG. 5 shows the shifting of data cell F (element 56") left by one level (arrow 59A). Due to this, the original element 56" nested under element 54' ceases to exist, and the element 54" nested under higher-level element 52 and comprising the data cell F (with its original data unit value) is formed. If thereafter data element 54' is shifted right by two levels (arrow 59B), data elements 54' and its child are shifted right and nested under data element 56 as data element 56'" and data element 58. Each shift is reflected by corresponding shift of nesting level in the underlying data graph. Thus, children of data units are preserved in the graph when they are shifted in the user interface to a different nesting level.

In some embodiments, the UI data elements comprise natural language helper elements, which are shown in connection with the editable data cells for assisting the user to enter natural language data. The content of the helper elements can be formed using the relation data unit associated with the natural language data unit concerned and, optionally, the data unit of its parent element.

In some embodiments, the data processor checks before allowing a shift, the shift against a predefined set of shifting rules, that the shift is allowable.

In some embodiments, the data units are associated with priority data fields that are used by the data processor to determine the content of the block of natural language generated. Typically, each data item and/or edge item comprises a priority data field that defines the priority of the data unit and/or relation contained therein.

In some embodiments, the first and second data units used by the data processor to travel the graph, are selected based on the priority data field values. For example, high priority value (or other specific values as defined in the system) may result in marking of a data unit as the first or the second data unit. The first and second data units may have the same or different priority.

In some embodiments, the data processor is adapted to include in the data unit set a minimal set of data units required to semantically, thematically, logically and/or quantitatively connect the first and one or more second data units using the data fields.

In some embodiments, the data processor is adapted to include in the data unit set a maximal set of data units that semantically, thematically, logically and/or quantitatively connect the first and one or more second data units.

The relation data units can be used in different ways in the text generation. For example, a "meronym" semantic relation between A and B can be simply converted to "A comprises B" or "A includes B" or "A is part of B" or "A is a member of B" or other corresponding expression. There may be provided only one conversion option or a conversion algorithm may choose one among many options. As another example, a thematic relation "definition" between A and B may be converted as "A is defined as B" or "A means B" or other corresponding expression. Thus, the conversion algorithm may take into account the relation class (semantic, thematic, quantity, logic) and subclass (e.g. meronym/hyponym, function/definition, at least one/a plurality, and/or, respectively). In addition, the conversion algorithm may take into account the content of the data units (e.g. for making linguistic tuning, such as adding articles and or choosing correct deflection form), as well as the relative position of the data units with respect to other data units it the graph (e.g. starting from a data unit that is closest to the root of the graph).

Figure 6A:
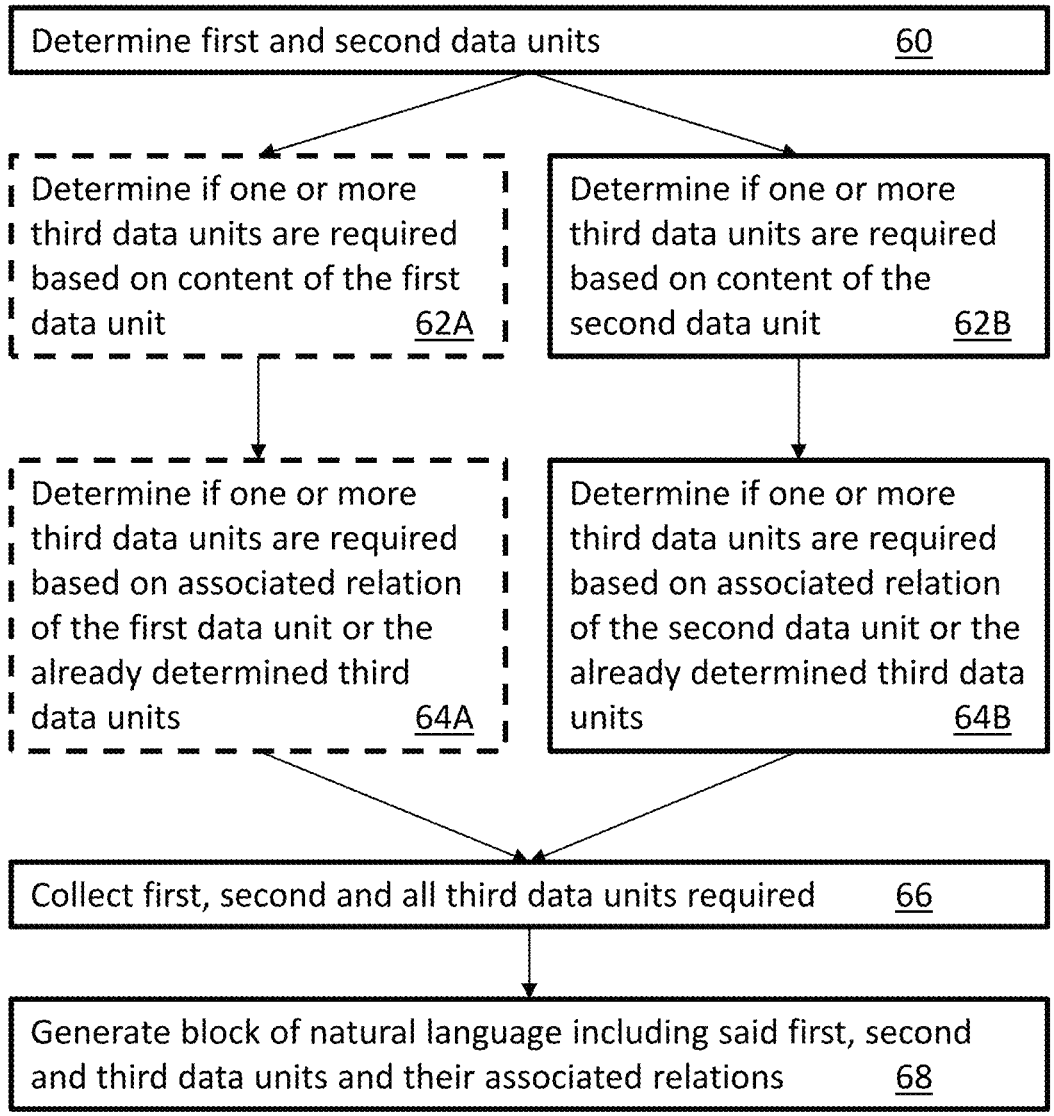
FIGS. 6A and 6B shows flow charts of natural language generation algorithms according to some embodiments of the invention.

FIG. 6A shows an exemplary method of generating the block of natural language based on a data graph. In step 60, first and second natural language data units that form the basis of generation are determined. There may be provided an automatic data unit selection algorithm that takes advantage of the contents of the data graph and optionally external sources of data. Instead or in addition to that, there may be provided user interface elements, so called marking elements, in connection with the data units through which the user can select the first and/or second data units.

In step 62B, it is determined if one or more additional data units are referred to in the second data units. In the affirmative, the additional data units are added to a data unit set which is being created (comprised of data item ID's). This process can be recursive, i.e. it can be checked if the additional data units refer to further additional data units and so on. In step 64B, it is determined if a relation associated with the second data unit necessitates the inclusion of some other data unit in the data unit set. For example, a thematic relation may necessitate the parent data unit of some data unit being included in the set in order to be able to form meaningful natural language, or a logic relation defined may necessitate the presence of another data unit in the same or another branch of the data graph being included.

The same collection process may be carried out for the first data unit (optional steps 62A, 64A) and for any additional second data units, if defined. In step 66, the collection results are combined in order to form a final set of natural language data units to be used for text generation.

In step 68, the data processor arranges, combines and optionally linguistically amends the natural language data units based on their associated relation data units and position in the data graph according to a predefined text generation algorithm, converting the data graph into natural language while preserving the relations defined between the data units.

Figure 6B:
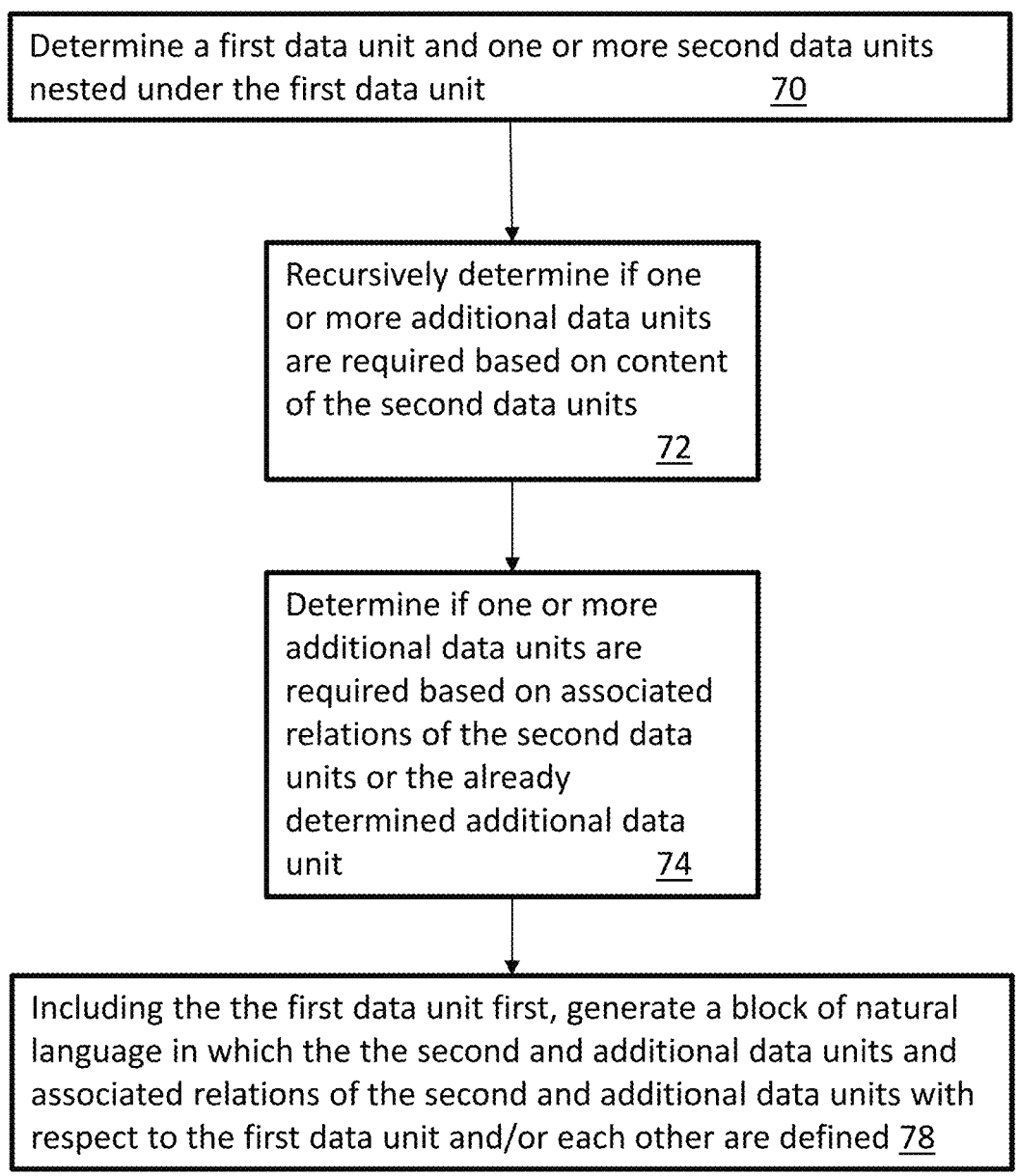

FIG. 6B shows a simple example of the text generation algorithm. In step 70, a first data unit (say, the "data unit A" of root item 10 of FIG. 2) and a second data unit (say, the "data unit C" of the leaf item 24') are selected. Next, in step 72, the content of the second data unit is checked for references to other data units (and, say, reference to "data unit C" of data item 14 is found and no recursive references are found). In step 74, the associated relations of data units in the set collected this far are checked and collected, if necessary (and, it is found that the thematic relation B-C' is of type that requires parent data unit, i.e. "data unit B" to be defined, as defined in the code base of the system). Finally, the collected data units are ordered as a meaningful multi-unit block of natural language.

In one example, the block of natural language is formed as "[data unit A] [semantic relation A-B-derived clause] [data unit B] [semantic relation B-C-derived clause] [data unit C] [thematic relation B-C'-derived clause using data unit B and data unit C'], which yields, using the exemplary data discussed above: "a vehicle comprising an engine space further comprising an electric motor, wherein the engine space fully encloses the electric motor", for example.

Advantages of the invention become apparent by imagining a situation where one wishes to change either the first or second data unit, or both, to other data units or add further second data units. Then, the same algorithm can be used to automatically generate a different block of natural language using the new starting points for the algorithm.

For example, changing the second data unit to "data unit D" in data item 16 of FIG. 1, defining a hyponym relation (keeping the rest of the graph intact) may yield "a vehicle comprising an electric motor, wherein the electric motor is a brushless motor" as the result.

In some embodiments, the system the user interface means of the system comprises digital image input means, digital image display means, and means for associating specific points of the image, as determined by the user through the user interface means, to the nested natural language data units in the data graph.

The system and method, in particular examples described above and illustrated in the drawings are specifically suitable for inputting, organizing, and storing data and generating natural language blocks for patent applications (in particular one or more claims and parts of description), and responses to office actions in patent matters. The same principles, in particular the present data schema, the can be, however, used for inputting, organizing, and storing data for and generating other technical specifications, such as data sheets, standards or user manuals, and other legal texts, such as contracts.

FIG. 7A shows an exemplary user interface for inputting a data graph. The graph is filled with simple exemplary data, with the aim of defining parts of an electric vehicle. As can be seen, the graph comprises a root data unit and a plurality of nested data units. As can be seen from the helper texts above each editable data cell, some of the nested data units are in "meronym" (reflected herein with " . . . comprising . . . " or " . . . comprises . . . ") semantic relation subclass, that is, have a meronym relation data unit associated thereto. One data unit is in "hyponym" semantic relation subclass (reflected herein with " . . . is . . . "), one data unit is in "function" thematic relation subclass (reflected herein with " . . . is provided for . . . ") and one data unit is in "relation/freeform" thematic relation subclass (reflected herein with helper " . . . relates to other features such that . . . "). Internal references in the data graph are shown in brackets in this example. The bracketed portions can be replaced with IDs in the data store. Specific user interface elements, herein the "plus" icons, can be used to add recursive (or further root) natural language data units into the graph.

FIG. 7B shows an exemplary claim set generated using the data graph of FIG. 7A. The root unit is marked as a first data unit (with round star icon). The last data unit is marked as a second data unit for independent claim generation purposes (black star). Three other data units are marked as second data units for dependent claim generation purposes (half black stars). Using this information and the principles discussed above, the data processor selects necessary additional data units and generates the output shown, using rules associated with the different relation classes and/or subclasses. It should be noted that although some data units ("engine space", "electric motor" and "wheels") are not flagged via the marking elements (the stars), they are still collected and semantically defined with respect to their parents in the graph. Changing the values of the marking elements, is reflected as regeneration of the text. In this example, contextual text (herein the claim dependencies) is added in the text generation phase. Articles are not added, but they can be added.

According to one aspect, there is provided a system for defining a concept using natural language, the system comprising a digital data store capable of storing a data graph according to a data schema, input means for entering natural language data units to the data graph, and a data processor for generating a block of natural language based on the data graph. The data schema allows storage of recursively nested natural language data units and semantic relation data units associated with the natural language data units into the data graph, the semantic relation data units being configured to define semantic relations between natural language data units in the data graph. In further embodiments of this aspect, the data schema allows storage of thematic, quantity and/or logic relation data associated with the natural language data units as discussed above in relation to other aspects and embodiments. In further embodiments of this aspect, the input means comprises a user interface means that are configured to graphically represent the data graph, including the nesting levels thereof, and to allow creating and changing the position of natural language units and relation unit associated therewith within the data graph or expanding the data graph.

The invention claimed is:

1. A system for generating a block of natural language, the system comprising
    a digital data store for storing a data graph according to a data schema,
    input sub-system for entering natural language data units to the data graph, and
    a data processor for generating a block of natural language based on the data graph, wherein
    the data schema defines a structure for said data graph, the structure containing
        recursively nested natural language data units and relation data units associated with the natural language data units, the relation data units being configured to define relations between said nested natural language data units in the data graph,
    the data processor is adapted to generate said block of natural language utilizing a plurality of said nested natural language data units selected from the data graph and relations between the nested natural language data units as defined by the relation data units associated therewith,
wherein the input sub-system is user interface sub-system configured to illustrate said natural language data units as human-readable and editable natural language data elements on a display, the nesting level of the natural language data unit in the data graph being reflected as vertical or horizontal position of the data natural language element on the display.

2. The system according to claim 1, wherein the data processor is further adapted to
    select a first set of natural language data units according to predefined selection criteria,
    form a second set of natural language data units based on the contents of natural language data units first set and relation data units associated with the data units in the first set, the second set being a superset of the first set, and
    use the second set for generating the block of natural language.

3. The system according to claim 2, wherein the data processor is adapted to
    select a first and one or more second natural language data units according to predefined selection criteria from the recursively nested data graph, the first and one or more second natural language data units forming the first set,
    travel the recursively nested data graph according to predefined rules starting from said one or more second natural language data units to said first natural language data unit, or vice versa, for forming the second set, and
    use the second set and the relation data units associated with natural language data units therein to generate said block of natural language.

4. The system according to claim 3, wherein said travelling of the data graph comprises selecting into said second data unit set one or more additional natural language data units based on content of the first and/or one or more second data units, and optionally recursively further additional data units based on the content of the additional data units, the additional data units being different from the first and second data units, and wherein said first, second and additional data units are used to generate said block of natural language.

5. The system according to claim 1, wherein each of the relation data units selectively link the natural language data unit it is associated with to one of at least two relation classes defining different relations between the natural language data unit and its parent unit such that linking to different relation classes is reflected as generation of different block of natural language by the data processor.

6. The system according to claim 1, wherein the relation data units comprise at least a first class of relation data units defining relations between successively nested natural language data units, the relations being selectable from a predefined set of subclasses of relations such that different subclasses result in generation of a different block of natural language by the data processor.

7. The system according to claim 1, wherein the relation data units comprise at least semantic relation data units defining semantic relations between successively nested natural language data units, the semantic relations being entirely or partly selectable from a predefined set of semantic relations.

8. The system according to claim 7, wherein the data processor is adapted to
    select a first and one or more second natural language data units according to predefined selection criteria,
    generate said block of natural language using a set of natural language data units semantically connecting the first and one or more second natural language data units, using said semantic relation data units.

9. The system according to claim 1, wherein the relation data units comprise thematic relation data units, logic relation data units, and/or quantity relation data units defining thematic, logic and/or quantity relations, respectively, between natural language data units of the data graph, the relations in each of these classes class being entirely or partly selectable from a predefined set of relations through said input sub-system, and the data processor is adapted to use said relation data units for generating the block of natural language.

10. The system according to claim 1, wherein the data graph stores the nested natural language data units and relation data units according to said data schema as data items each containing a natural language data unit and a relation data unit associated therewith, or as data items containing the natural language data unit and edge items connecting two or more data items, the relation data units being contained in the edge items, or a combination of these.

11. The system according to claim 1, wherein the data schema allows for storage of two types of relation data units, the first type at least partly or entirely pre-defining a semantic, thematic, logic or quantity relation, the pre-defined relation being selectable via said input sub-system being user interface sub-system, and the second type allowing the user to define the semantic, thematic, logic or quantity relation via said user interface sub-system.

12. The system according to claim 1, wherein
    the input sub-system is user interface sub-system configured to allow user-selection of the content of a relation data unit associated between two successively nested natural language data units and/or
    the data processor is configured to choose the content of a relation data unit, in particular semantic relation data unit, associated between two successively nested natural language data units based on the contents of the natural language data units.

13. The system according to claim 1, wherein said input sub-system is user interface sub-system and said plurality of natural language data units are at least partly selected by the data processor
    by said user interface sub-system comprising a user-selectable marking elements associated with said natural language data units and the data processor selecting said plurality of natural language data units based on state of the marking element, or
    automatically by the data processor based on the position of the data units in the data graph and/or user interface sub-system.

14. The system according to claim 1, wherein the input sub-system is user interface sub-system allowing for creating new data elements corresponding to new natural language data units in the data graph and changing the nesting level of the data units in said data graph by moving the data elements on the display using a user input device.

15. The system according to claim 1, wherein the data schema allows for storage of natural language data units that contain one or more non-natural language references to one or more other natural language data units of the data graph, and the data processor is adapted to generate said block of natural language further utilizing said references.

16. The system according to claim 1, wherein the data processor is adapted to generate a claim or part of description of a patent application as said block of natural language.

17. A method of producing a block of natural language, the method comprising
    storing natural language data units in a non-transitory digital data store, wherein the natural language data units are entered using an input sub-system,
    processing contents of the data store as to generate said block of natural language using the natural language data units,
wherein
    the natural language data units are stored at least partially in a nested structure in a recursive data graph,
    at least some of the natural language data units are associated with relation data units that define a relation between two natural language data units,
said processing comprises
    selecting a first and one or more second natural language data units from the recursive data graph,
    using the first and one or more second data units and predefined selection rules, selecting from the recursive data graph a data unit set which is a subset of all natural language data units of the data graph, and
    using the data unit set and values of said relation data units, generating said block of natural language,
wherein the input sub-system is user interface sub-system configured to illustrate said natural language data units as human-readable and editable natural language data elements on a display, the nesting level of the natural language data unit in the data graph being reflected as vertical or horizontal position of the data natural language element on the display.

18. The method according to claim 17, wherein at least some of the relations data units define a relation between successively nested natural language data units in the recursive data graph, such that different values of the relation data units result in different blocks of natural language in said processing.

19. The method according to claim 17, wherein the relation is a semantic, thematic, logic and/or quantitative relation.

\* \* \* \* \*